US012529472B1

(12) United States Patent
Xu

(10) Patent No.: US 12,529,472 B1
(45) Date of Patent: Jan. 20, 2026

(54) LAMP BRACKET AND LAMP

(71) Applicant: Yunlong Xu, Guangdong (CN)

(72) Inventor: Yunlong Xu, Guangdong (CN)

( * ) Notice: Subject to any disclaimer, the term of this patent is extended or adjusted under 35 U.S.C. 154(b) by 0 days.

(21) Appl. No.: 19/258,043

(22) Filed: Jul. 2, 2025

(30) Foreign Application Priority Data

May 23, 2025 (CN) ........................ 202521044864.3

(51) Int. Cl.
*F21V 21/14* (2006.01)
*F16B 2/12* (2006.01)

(52) U.S. Cl.
CPC ................ *F21V 21/14* (2013.01); *F16B 2/12* (2013.01)

(58) Field of Classification Search
CPC .................................. F21V 21/14; F16B 2/12
See application file for complete search history.

(56) References Cited

U.S. PATENT DOCUMENTS 10,161,601 B1 * 12/2018 Chen ......................... F21S 6/00
10,845,042 B1 * 11/2020 Shellman .................. F21V 1/06
2010/0097812 A1 * 4/2010 Cheng ....................... F21S 4/10 362/382
2015/0077980 A1 * 3/2015 Coughlin ............... F21V 21/14 362/183

* cited by examiner

*Primary Examiner* — Christopher E Dunay
(74) *Attorney, Agent, or Firm* — HOWARD M COHN and Associates, LLC

(57) ABSTRACT

A lamp bracket and a lamp are provided. The lamp bracket a first rod portion having a hollow region therein, a second rod portion, and elastic bodies. The first rod portion defines a first opening at a first end thereof, and the first opening is communicated with the hollow region. The second rod portion extends through the first opening and is slidable relative to the first rod portion, a first end of the second rod portion extends into the hollow region and slides toward a second end of the first rod portion. A first end of each of the elastic bodies is connected to the second end of the first rod portion, and a second end of each of the elastic bodies is connected to a second end of the second rod portion.

18 Claims, 10 Drawing Sheets

1

LAMP BRACKET AND LAMP

TECHNICAL FIELD

The present disclosure relates to a technical field of lamps, and in particular to a lamp bracket and a lamp.

BACKGROUND

With the development of modern society, user demands for lamps extend beyond mere illumination functionality to include decorative appeal and portability. Lantern brackets, serving as conventional decorative lamps, are widely used in settings, such as festive celebrations and indoor/outdoor decorations. However, the conventional lantern brackets predominantly feature fixed structures, occupying substantial space during transportation and storage, which increases transportation costs and storage difficulties.

SUMMARY

Embodiments of the present disclosure provide a lamp bracket and a lamp to improve portability.

In a first aspect, the embodiments of the present disclosure provide the lamp bracket, including a first rod portion having a hollow region therein, a second rod portion, and elastic bodies. The first rod portion defines a first opening at a first end thereof, and the first opening is communicated with the hollow region. The second rod portion extends through the first opening and is slidable relative to the first rod portion, a first end of the second rod portion extends into the hollow region and slides toward a second end of the first rod portion. A first end of each of the elastic bodies is connected to the second end of the first rod portion, and a second end of each of the elastic bodies is connected to a second end of the second rod portion. When the second rod portion is in a first position relative to the first rod portion, the elastic bodies axially extend along the first rod portion. When the second rod portion is in a second position relative to the first rod portion, the elastic bodies are in a bent configuration.

Furthermore, the lamp bracket further includes a first base and a second base, the first base is connected to the second end of the first rod portion, the second base is connected to the second end of the second rod portion. The first end of each of the elastic bodies is connected to the first base and is connected to the second end of the first rod portion through the first base, and the second end of each of the elastic bodies is connected to the second base and is connected to the second end of the second rod portion through the second base.

Furthermore, the lamp bracket further includes at least one limiting portion. When the second rod portion is in the second position relative to the first rod portion, the at least one limiting portion is connected to the second rod portion to secure the second rod portion in the second position.

Furthermore, the first rod portion defines a second opening at the second end thereof. When the first end of the second rod portion slides outward through the second opening, the at least one limiting portion is connected to the second end of the second rod portion to secure the second rod portion in the second position.

Furthermore, the first base defines at least one sliding groove, the at least one limiting portion is disposed in the at least one sliding groove, a protrusion is disposed at the first end of the second limiting portion. When the at least one limiting portion is positioned at a first side of the protrusion facing the second base, the second rod portion is secured in the second position.

Furthermore, the at least one limiting portion includes a clamping block and a first elastic component, the clamping block and the first elastic component are disposed in the at least one sliding groove. When the at least one limiting portion is disposed at the first side of the protrusion facing the second base, the first elastic component is elastically connected between the clamping block and the first base to secure the second rod portion in the second position.

Furthermore, the protrusion includes a first guiding surface on a second side thereof facing away from the second base. When the first end of the second rod portion slides outward through the second opening, the first guiding surface drives the clamping block to move toward the first elastic component to deform the first elastic component. After the protrusion clears the clamping block, a restoration force of the first elastic component drives the clamping block to be positioned at the first side of the protrusion facing the second base.

Furthermore, the clamping block includes a second guiding surface on one side thereof facing the second base. When the first end of the second rod portion slides outward through the second opening, the first end of the second rod portion engages the second guiding surface to drive the clamping block to move toward the first elastic component.

Furthermore, the first base defines two sliding grooves, the two sliding grooves are respectively disposed at two sides of the second opening. Two limiting portions are provided, each of the two limiting portions is disposed in a corresponding one of the two sliding grooves.

Furthermore, the first base defines at least one sliding groove, the at least one limiting portion includes a clamping block and a first elastic component, and the clamping block and the first elastic component are disposed in the at least one sliding groove. The second rod portion defines at least one positioning hole at the first end thereof, the clamping block is engageable with the at least one positioning hole, the first elastic component is elastically connected between the clamping block and the first base, so as to secure the second rod portion in the second position.

Furthermore, the first base includes a first bottom plate, a first side plate, and a first sleeve, the first side plate and the first sleeve are respectively disposed at two sides of the first bottom plate. The first rod portion is disposed in the first sleeve, the limiting portion is disposed at one side of the first bottom plate facing away from the first sleeve. The first side plate is disposed around a periphery of the first bottom plate, and an outer side of the first side plate is connected to each of the elastic bodies.

Furthermore, the at least one limiting portion includes an elastic piece, the elastic piece is connected to the first base, the first end of the second rod portion defines a clamping groove, the elastic piece is inserted into the clamping groove to secure the second rod portion in the second position; or, the at least one limiting portion includes the elastic piece, the elastic piece is connected to the first end of the second rod portion, the first base defines the clamping groove, the elastic piece is inserted into the clamping groove to secure the second rod portion in the second position.

Furthermore, the at least one limiting portion includes a clamping portion, the second end of the first rod portion defines a first positioning hole, the first end of the second rod portion defines a second positioning hole. When the second rod portion is in the second position relative to the first rod portion, the clamping portion is inserted into both the first positioning hole and the second positioning hole to secure the second rod portion in the second position.

Furthermore, the lamp bracket further includes at least one positioning portion. When the second rod portion is in the first position relative to the first rod portion, at least one of the first rod portion and the second rod portion is connected to the at least one positioning portion to secure the second rod portion in the first position.

Furthermore, the second base includes a second bottom plate and a second sleeve, the second sleeve is connected to one side of the second bottom plate, the second rod portion is disposed in the second sleeve, and an outer side of the second bottom plate is connected to each of the elastic bodies.

Furthermore, the lamp bracket includes a second elastic component, the second elastic component is sleeved on the second rod portion and is at least partially disposed in the second sleeve. When the second rod portion is in the second position relative to the first rod portion, the first rod portion abuts against the second elastic component.

Furthermore, when the second rod portion is in the first position relative to the first rod portion, the second elastic component is partially exposed from the second sleeve.

In a second aspect, the embodiments of the present disclosure further provide the lamp, including the lamp bracket as foregoing and at least one light strip disposed on the lamp bracket.

Furthermore, at least one of the elastic bodies includes at least one positioning lug, the at least one positioning lug is connected to the at least one light strip to limit movement of the at least one light strip.

Furthermore, each of two ends of each of the elastic bodies includes the at least one positioning lug.

According to the embodiments of the present disclosure, the lamp bracket includes the first rod portion and the second rod portion that are coaxially sleeved together and capable of relative sliding movement. When the lamp bracket is to be placed in a stored state, the second rod portion is slid to the first position relative to the first rod portion, that is, the second rod portion is positioned further away from the first rod portion, at this time, the elastic bodies connected to the first rod portion and the second rod portion are thereby axially extended into a relatively straight, elongated strip-like shape. As a result, an overall structure of the lamp bracket becomes slender, a volume of the lamp bracket is significantly reduced, which facilitates transportation of the lamp bracket and is convenient for users to store the lamp bracket at home without occupying excessive space, thereby greatly improving the portability of the lamp bracket. When the lamp bracket is in a use state, the second rod portion is slid to the second position relative to the first rod portion, that is, the first rod portion and the second rod portion are relatively close and partially overlapped. In this configuration, the elastic bodies, due to material properties thereof, bend into an arc shape, forming a three-dimensional supporting framework in a shape of a lantern. After bending, the elastic bodies generate sufficient radial supporting force to stably maintain the shape of the lantern, ensuring stability and aesthetic appearance of the lamp bracket when illuminated. Each of the elastic bodies is made from a material having a certain degree of rigidity while still being bendable, such as a metal wire or a plastic rod, which allows the elastic bodies to maintain a compact, strip-like shape during storage, and to be bent and shaped into the arc shape during use, thereby providing stable support and shaping for the lamp bracket. Compared with conventional lantern brackets having fixed structures or those requiring complex assembly procedures before use, the lamp bracket according to the embodiments of the present disclosure is capable of being switched to a stored state during transportation and storage, thereby significantly saving storage space and reducing transportation and warehousing costs, enabling more convenient distribution and storage of the lamp bracket. During use, the users only need to perform a simple sliding operation to move the second rod portion to the second position that is relatively closer to the first rod portion, after which the elastic bodies automatically bend into the arc shape to forming a stable supporting framework in the shape of the lantern. An entire transition process of the lamp bracket does not require any complicated assembly steps, offering a simple and efficient operation that enables the users to quickly switch the lamp bracket between the stored state and use state, significantly enhancing user experience.

BRIEF DESCRIPTION OF DRAWINGS

In order to more clearly illustrate technical solutions in embodiments of the present disclosure, accompanying drawings required in description of the embodiments are briefly described below, and obviously, the accompanying drawings in the following description are merely some embodiments of the present disclosure, and for those who skilled in the art, other drawings may be obtained according to structures shown in these drawings without creative efforts.

For a more complete understanding of the present disclosure and corresponding beneficial effects, following description is made with reference to the accompanying drawings, in which the same reference numerals refer to the same parts.

Figure 1:
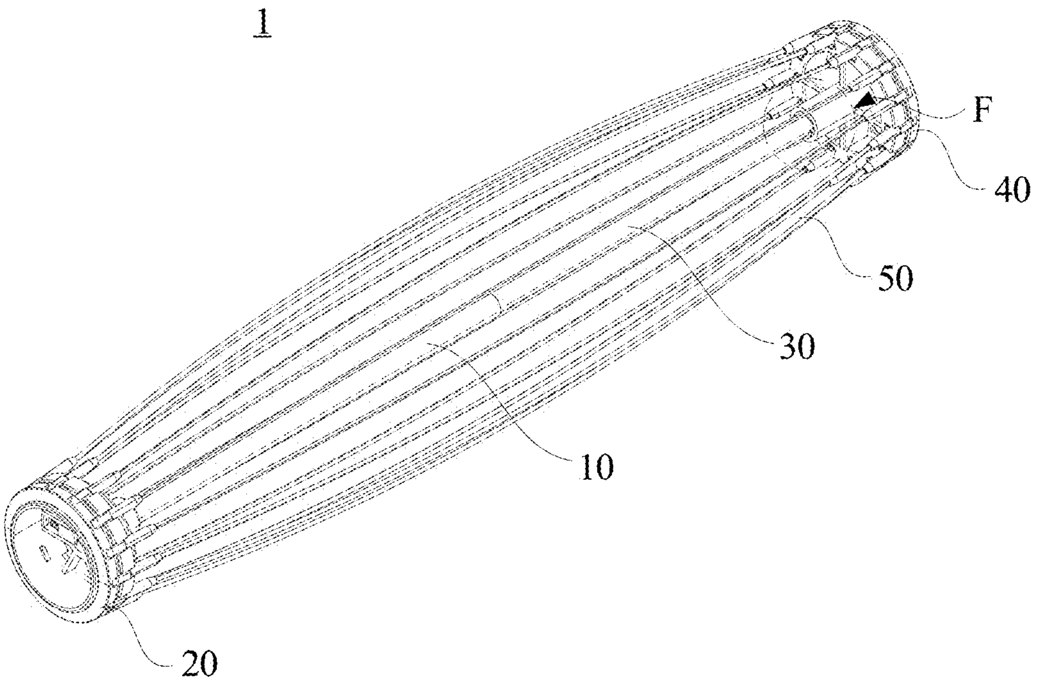
FIG. 1 is a structural schematic diagram of a lamp bracket in a stored state according to one embodiment of the present disclosure.

Reference numerals in the drawings: 1. lamp bracket; 10. first rod portion; 11. hollow region; 13. first opening; 15. second opening; 20. first base; 21. sliding groove; 22. first bottom plate; 24. first side plate; 26. first sleeve; 30. second rod portion; 32. protrusion; 321. first guiding surface; 40. second base; 42. second bottom plate; 44. second sleeve; 50. elastic body; 52. positioning lug; 60. limiting portion; 62. clamping block; 621. second guiding surface; 64. first elastic component; 70. second elastic component; 80. at least one light strip.

DETAILED DESCRIPTION OF EMBODIMENTS

The following clearly and completely describes technical solutions in embodiments of the present disclosure with reference to accompanying drawings in the embodiments of the present disclosure. Obviously, described embodiments are only a part but not all of the embodiments of the present disclosure. The following description of at least one exemplary embodiment is merely illustrative in nature and is in no way intended to limit the present disclosure, corresponding applications, or corresponding uses. All other embodiments obtained by those who skilled in the art based on the embodiments of the present disclosure without creative efforts shall fall within a protection scope of the present disclosure.

Figure 2:
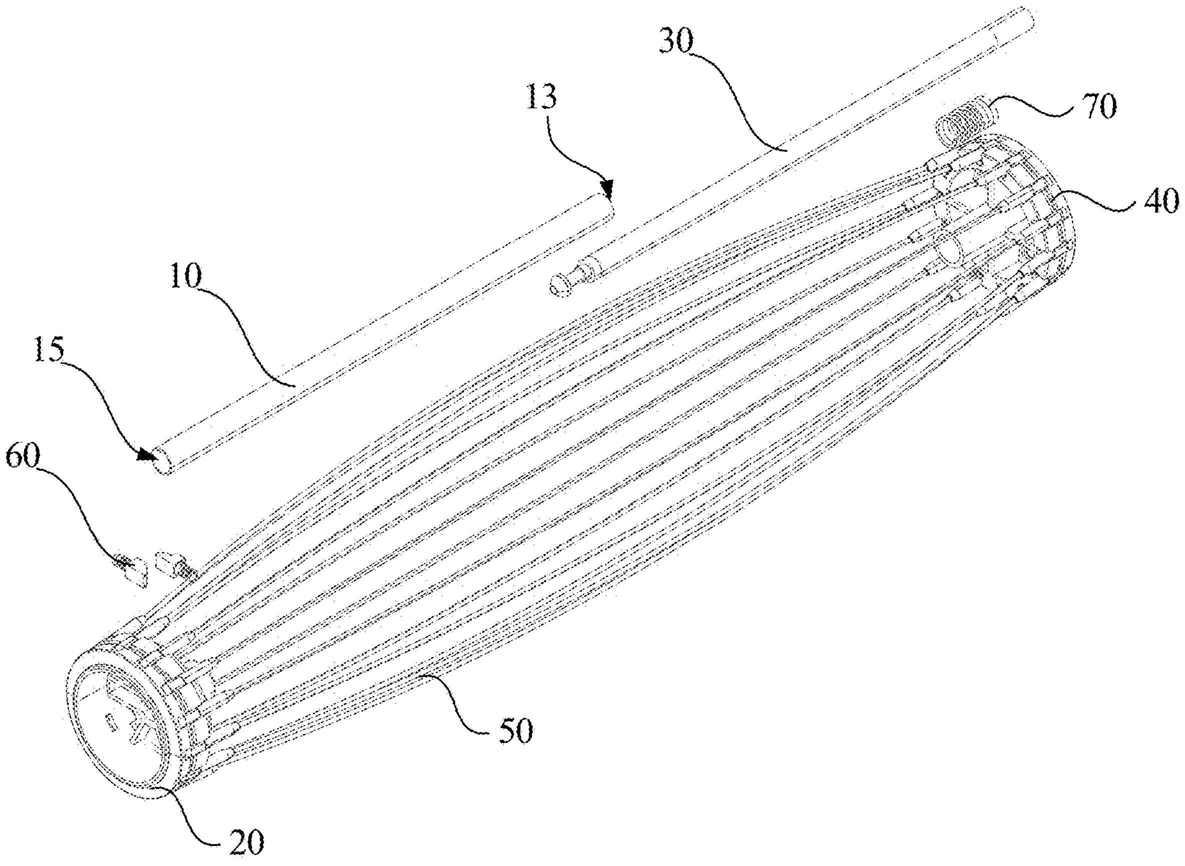
FIG. 2 is an exploded schematic diagram of the lamp bracket shown in FIG. 1.
Figure 3:
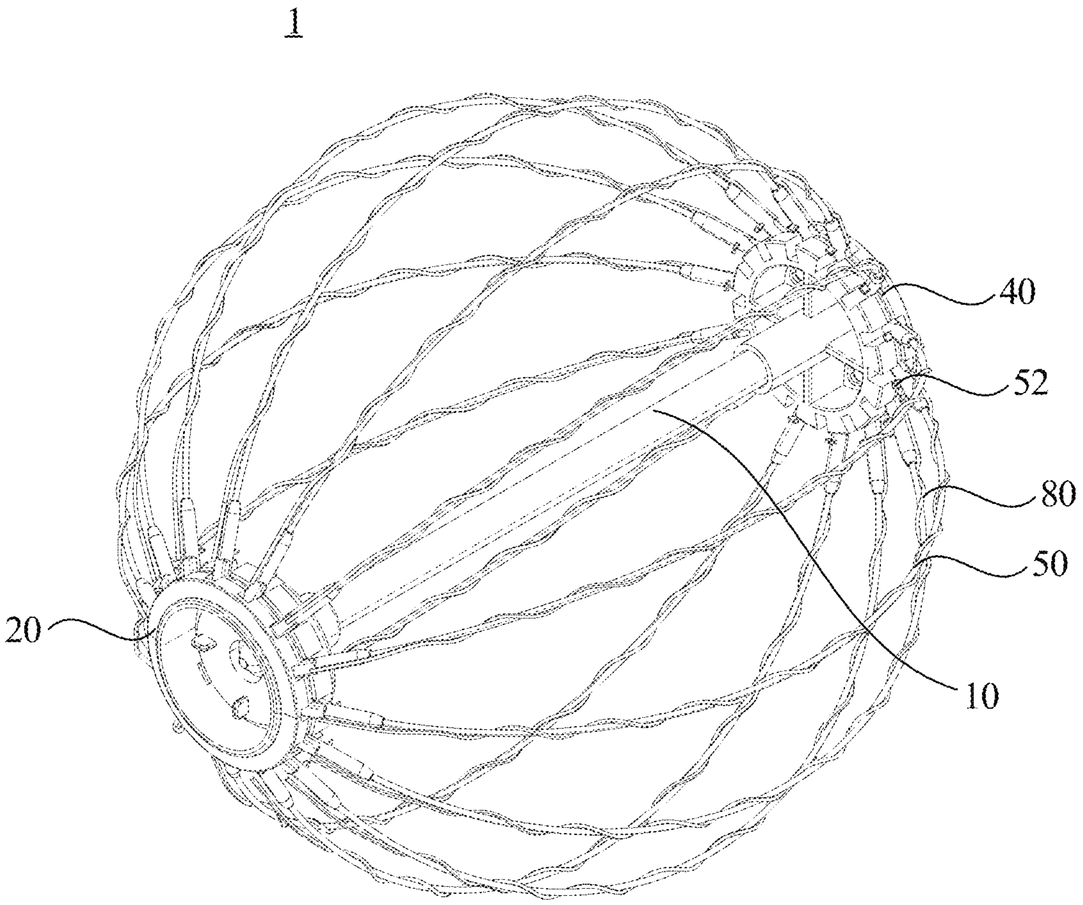
FIG. 3 is a structural schematic diagram of the lamp bracket in a use state according to one embodiment of the present disclosure.

As used herein, a term "embodiment" means that a particular feature, structure, or characteristic described in connection with an embodiment may be included in at least one embodiment of the present disclosure. Appearance of the term "embodiment" in various locations throughout the specification does not necessarily refer to the same embodiment, nor does it imply that the embodiments of the present disclosure are mutually exclusive, independent, or alternative to one another. Those who skilled in the art may readily appreciate, both explicitly and implicitly, that the embodiments described herein may be combined with other embodiments Please refer to FIGS. 1-3, FIG. 1 is a structural schematic diagram of a lamp bracket in a stored state according to one embodiment of the present disclosure, FIG. is an exploded schematic diagram of the lamp bracket shown in FIG. 1, and FIG. 3 is a structural schematic diagram of the lamp bracket in a use state according to one embodiment of the present disclosure.

The embodiments of the present disclosure provide the lamp bracket 1, including a first rod portion 10 having a hollow region 11 therein, a second rod portion 30 portion, and elastic bodies 50. The first rod portion 10 defines a first opening 13 at a first end thereof, and the first opening 13 is communicated with the hollow region 11. The second rod portion 30 extends through the first opening 13 and is slidable relative to the first rod portion 10, a first end of the second rod portion 30 extends into the hollow region 11 and slides toward a second end of the first rod portion 10. A first end of each of the elastic bodies 50 is connected to the second end of the first rod portion 10, and a second end of each of the elastic bodies 50 is connected to a second end of the second rod portion 30. Specifically, when the second rod portion 30 is in a first position relative to the first rod portion 10 (as shown in FIG. 1), the elastic bodies 50 axially extend along the first rod portion. When the second rod portion 30 is in a second position relative to the first rod portion 10 (as shown in FIG. 3), the elastic bodies 50 are in a bent configuration.

According to the embodiments of the present disclosure, the lamp bracket 1 includes the first rod portion 10 and the second rod portion 30 that are coaxially sleeved together and capable of relative sliding movement. When the lamp bracket 1 is to be placed in the stored state, the second rod portion 30 is slid to the first position relative to the first rod portion 10, that is, the second rod portion 30 is positioned further away from the first rod portion 10, at this time, the elastic bodies 50 connected to the first rod portion 10 and the second rod portion 30 are thereby axially extended into a relatively straight, elongated strip-like shape. As a result, an overall structure of the lamp bracket 1 becomes slender, a volume of the lamp bracket 1 is significantly reduced, which facilitates transportation of the lamp bracket 1 and is convenient for users to store the lamp bracket 1 at home without occupying excessive space, thereby greatly improving the portability of the lamp bracket 1. When the lamp bracket 1 is in the use state, the second rod portion 30 is slid to the second position relative to the first rod portion 10, that is, the first rod portion 10 and the second rod portion 30 are relatively close and partially overlapped. In this configuration, the elastic bodies 50, due to material properties thereof, bend into an arc shape, forming a three-dimensional supporting framework in a shape of a lantern. After bending, the elastic bodies 50 generate sufficient radial supporting force to stably maintain the shape of the lantern, ensuring stability and aesthetic appearance of the lamp bracket 1 when illuminated.

Specifically, each of the elastic bodies 50 is made from a material having a certain degree of rigidity while still being bendable, such as a metal wire or a plastic rod, which allows the elastic bodies 50 to maintain a compact, strip-like shape during storage, and to be bent and shaped into the arc shape during use, thereby providing stable support and shaping for the lamp bracket 1. Compared with conventional lantern brackets having fixed structures or those requiring complex assembly procedures before use, the lamp bracket 1 according to the embodiments of the present disclosure is capable of being switched to a stored state during transportation and storage, thereby significantly saving storage space and reducing transportation and warehousing costs, enabling more convenient distribution and storage of the lamp bracket 1. During use, the users only need to perform a simple sliding operation to move the second rod portion 30 to the second position that is relatively closer to the first rod portion 10, after which the elastic bodies 50 automatically bend into the arc shape to forming a stable supporting framework in the shape of the lantern. An entire transition process of the lamp bracket 1 does not require any complicated assembly steps, offering a simple and efficient operation that enables the users to quickly switch the lamp bracket 1 between the stored state and use state, significantly enhancing user experience.

In some embodiments, the lamp bracket 1 further includes a first base 20 and a second base 40, the first base 20 is connected to the second end of the first rod portion 10, the second base 40 is connected to the second end of the second rod portion 30. The first end of each of the elastic bodies 50 is connected to the first base 20 and is connected to the second end of the first rod portion 10 through the first base 20, and the second end of each of the elastic bodies 50 is connected to the second base 40 and is connected to the second end of the second rod portion 30 through the second base 40.

In the embodiment, the first base 20 is connected to the second end of the first rod portion 10 to provide corresponding support thereto. The second base 40 is connected to the second end of the second rod portion 30 to provide corresponding support thereto. Opposite ends of each of the elastic bodies 50 are respectively connected to the first base 20 and the second base 40, which allows the elastic bodies 50 to deform in response to relative sliding movement between the first rod portion 10 and the second rod portion 30.

When the second rod portion 30 is slid out from the first rod portion 10 to increase a distance between the second end of the second rod portion 30 and the second end of the first rod portion 10, a distance between the first base 20 and the second base 40 accordingly increases, causing the elastic bodies 50 to stretch into a taut, elongated shape. At this time, the lamp bracket 1 is small in volume, which is convenient for storage and easy to transport. Conversely, when the second rod portion 30 moves into the first rod portion 10 to decrease the distance between the second end of the second rod portion 30 and the second end of the first rod portion 10, the distance between the first base 20 and the second base 40 accordingly decreases, at this time, the elastic bodies 50 bend into the arc shape, forming three-dimensional supporting framework in the shape of the lantern that provides stable support for the lamp bracket 1.

In this embodiment, the first base 20 and the second base 40 serve as secure anchoring points for the opposite ends of each of the elastic bodies 50. In a process of switching the lamp bracket 1 from the stored state to the use state, the elastic bodies 50 are subjected to both tensile and bending forces. The first base 20 and the second base 40 are configured to ensure even force distribution at the opposite ends of each of the elastic bodies 50, enabling synchronized deformation and allowing the elastic bodies 50 to reliably function throughout a transformation process of the lamp bracket 1. When the lamp bracket 1 is in the use state, the first base 20, the second base 40, and the elastic bodies 50 cooperatively work to form a more stable supporting frame, so that the lamp bracket 1 is capable of bearing a certain external force after being illuminated and is not easy to deform or shake. In this way, stability of the lamp bracket 1 is enhanced, thereby providing better user experience during use.

Figure 4:
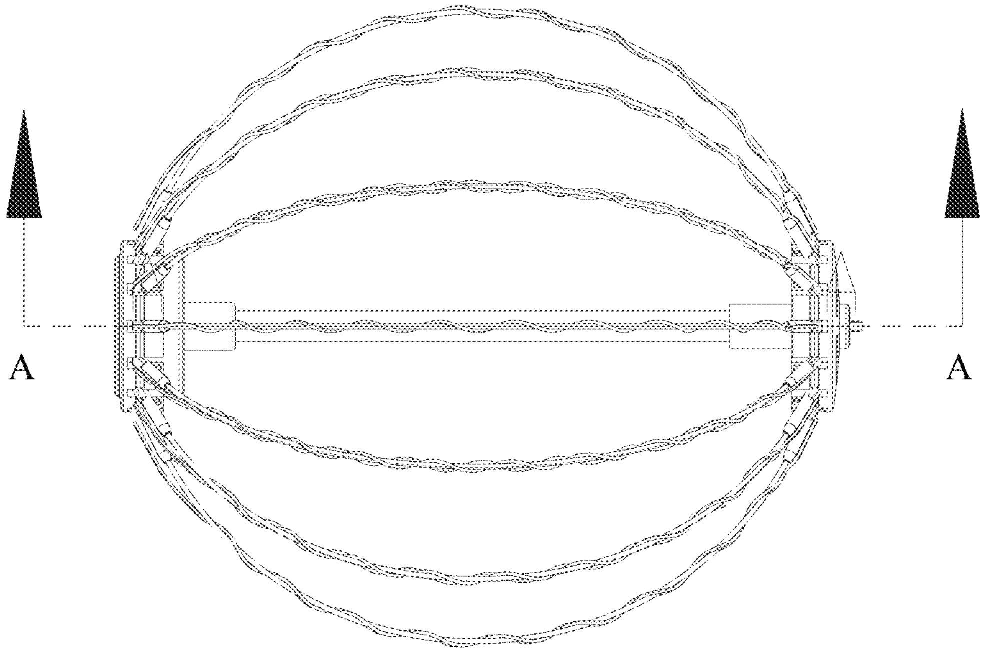
FIG. 4 is another structural schematic diagram of the lamp bracket shown in FIG. 3.
Figure 5:
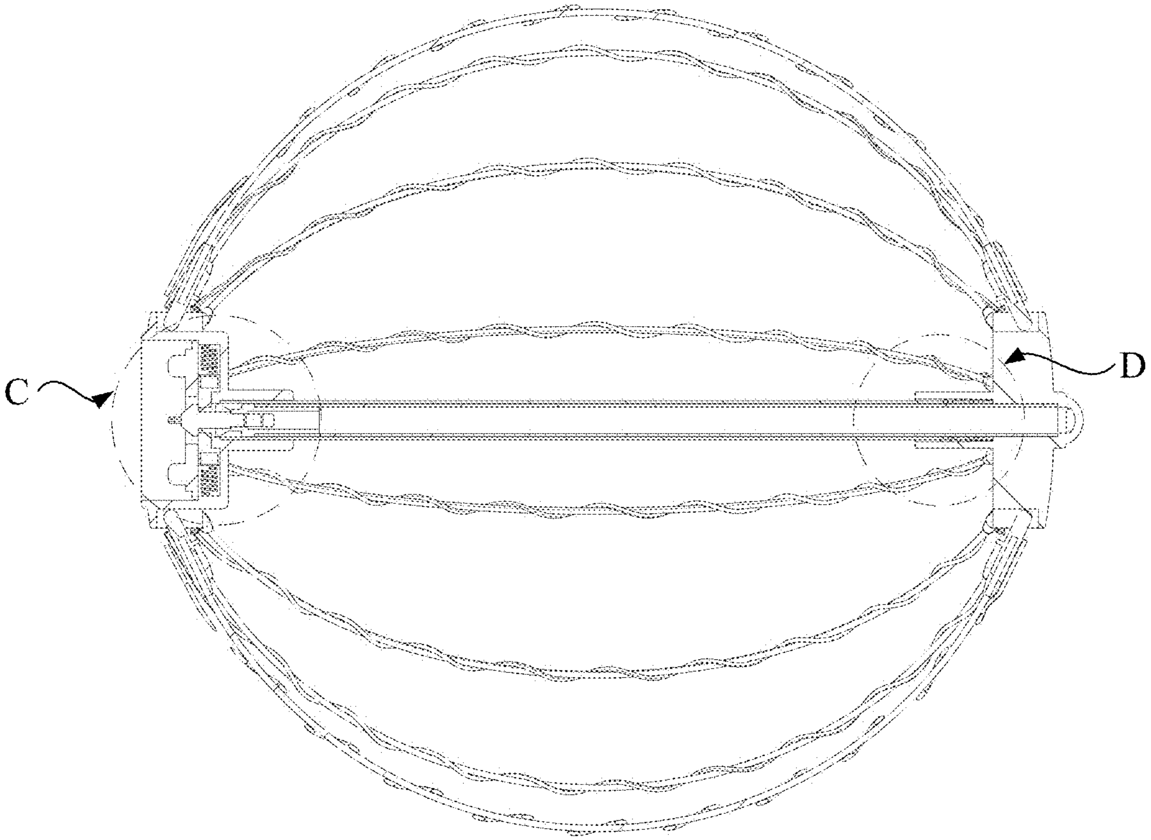
FIG. 5 is a cross-sectional schematic diagram of the lamp bracket shown in FIG. 4, taken long the line A-A.
Figure 6:
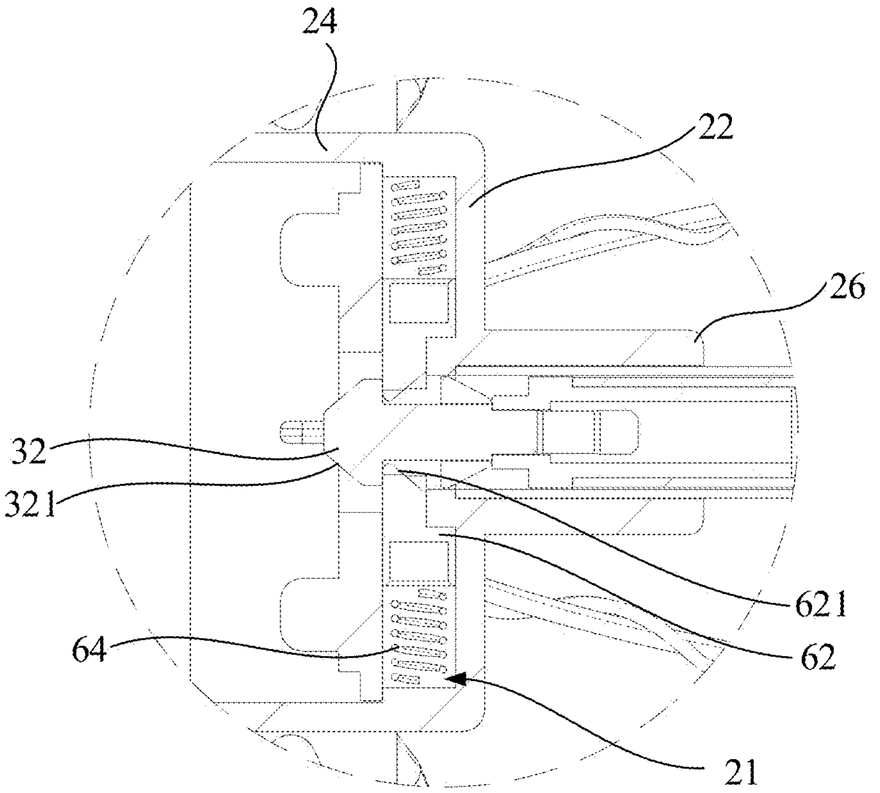
FIG. 6 is an enlarged schematic diagram of portion C shown in FIG. 5.

Please further refer to FIGS. 4-6, FIG. 4 is another structural schematic diagram of the lamp bracket shown in FIG. 3, FIG. 5 is a cross-sectional schematic diagram of the lamp bracket shown in FIG. 4, taken long the line A-A, and FIG. 6 is an enlarged schematic diagram of portion C shown in FIG. 5.

In some embodiments, the lamp bracket 1 further includes at least one limiting portion 60. When the second rod portion 30 is in the second position relative to the first rod portion 10, the at least one limiting portion 60 is connected to the second rod portion 30 to secure the second rod portion 30 in the second position.

In the embodiment, when the second rod portion 30 is slid to the second position relative to the first rod portion 10, the at least one limiting portion 60 is connected to the second rod portion 30, thereby stably limiting the second rod portion 30 in the second position, ensuring the stability of the lamp bracket 1 during use, preventing accidental sliding of the second rod portion 30, and preventing the lamp bracket 1 from shaking or deforming due to unstable structure after being illuminated. Through arrangement of the at least one limiting portion 60, the users safely use the lamp bracket 1 without worrying about the stability the lamp bracket, thereby improving the user experience.

In some embodiments, the first rod portion 10 defines a second opening 15 at the second end thereof. When the first end of the second rod portion 30 slides outward through the second opening 15, the at least one limiting portion 60 is connected to the second end of the second rod portion 30 to secure the second rod portion 30 in the second position.

In the embodiment, when the lamp bracket 1 needs to be expanded, the second rod portion 30 is slid outward from an interior of the first rod portion 10 through the second opening 15, and when the second rod portion 30 is slid to the second position relative to the first rod portion 10, the first end of the second rod portion 30 that slides outward through the second opening 15 is tightly connected to the at least one limiting portion 60, the at least one limiting portion 60 fixes the second rod portion 30 through engaging or clamping, so as to firmly hold the second rod portion 30 in the second position, effectively preventing the first end of the second rod portion 30 from accidentally sliding into the first rod portion 10 during use, thereby ensuring the stability of lamp bracket 1.

Exemplarily, when the second rod portion 30 is slid to be in the second position relative to the first rod portion 10, the first end of the second rod portion 30 may not slide outward through the second opening 15, and the second rod portion 30 is stabilized in the second position in a snap-fit manner. For example, the second rod portion 30 including an elastic convex portion, and the first rod portion 10 defines a limiting hole on a corresponding position thereof, and when the second rod portion 30 is slid to the second position, the elastic convex portion of the second rod portion 30 is directly clamped into the limiting hole of the first rod portion 10 to secure the second rod portion 30 in the second position. For another example, the first rod portion 10 includes the elastic convex portion, the second rod portion 30 defines the limiting hole on a corresponding position thereof, and when the second rod portion 30 is slid to the second position, the elastic convex portion of the first rod portion 10 is directly clamped into the limiting hole of the second rod portion 30 to secure the second rod portion 30 in the second position. In another example, the at least one limiting portion 60 includes two magnets respectively disposed at corresponding positions of the first rod portion 10 and the second rod portion 30, and when the second rod portion 30 is slid to the second position, the two magnets attract each other to fix the second rod portion 30. In another example, the first rod portion 10 includes a rubber pad at a corresponding portion thereof, when the second rod portion 30 is slid to the second position, the rubber pad is in close contact with the second rod portion 30, and the second rod portion 30 is fixed by friction force.

The above limiting mechanisms ensure the stability of the lamp bracket 1 in the use state, and avoid shaking or deformation caused by accidental sliding of the second rod portion 30, thereby improving reliability and safety of the user experience.

Figure 7:
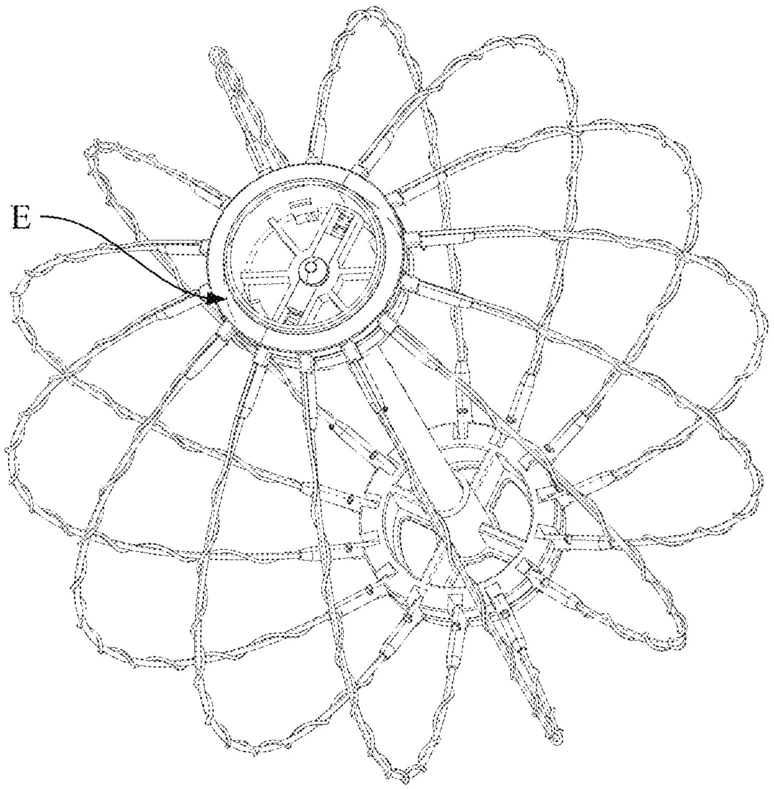
FIG. 7 is another structural schematic diagram of the lamp bracket shown in FIG. 3.
Figure 8:
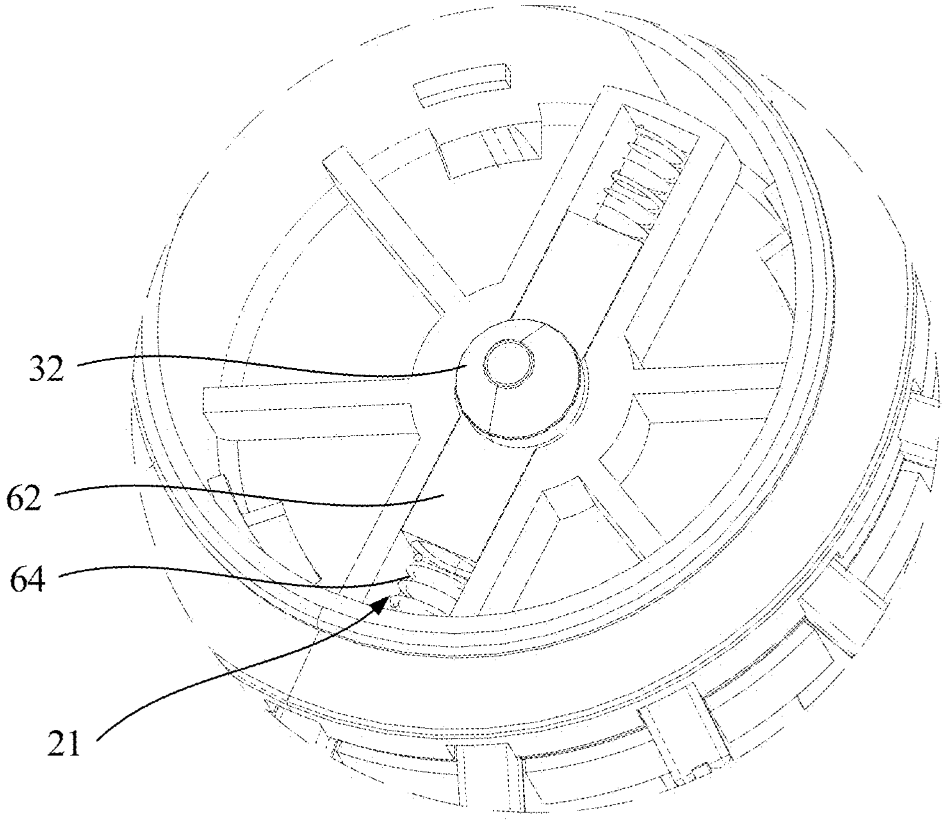
FIG. 8 is an enlarged schematic diagram of portion E shown in FIG. 7.

Please refer to FIGS. 7-8, FIG. 7 is another structural schematic diagram of the lamp bracket shown in FIG. 3, and FIG. 8 is an enlarged schematic diagram of portion E shown in FIG. 7.

In some embodiments, the first base 20 defines at least one sliding groove 21, the at least one limiting portion 60 is disposed in the at least one sliding groove 21, a protrusion 32 is disposed at the first end of the second limiting portion 60. When the at least one limiting portion 60 is positioned at a first side of the protrusion 32 facing the second base 40, the second rod portion 30 is secured in the second position.

In the embodiment, the at least one limiting portion 60 is disposed in the at least one sliding groove 21 of the first base 20, and the protrusion 32 is disposed at the first end of the second limiting portion 60. When the second rod portion 30 is slid to the second position, the limiting portion 60 is positioned at a first side of the protrusion 32 facing the second base 40 and firmly secure the second rod portion 30 in the second position. The at least one sliding groove 21 provides a clear and defined movement path for the at least one limiting portion 60, thereby ensuring that the at least one limiting portion 60 moves along the at least one sliding groove 21 and accurately engages with the protrusion 32 on the second rod portion 30, so that the lamp bracket 1 remains structurally stable during use.

In some embodiments, the at least one limiting portion 60 includes a clamping block 62 and a first elastic component 64, the clamping block 62 and the first elastic component 64 are disposed in the at least one sliding groove 21. When the at least one limiting portion 60 is disposed at the first side of the protrusion 32 facing the second base 40, the first elastic component 64 is elastically connected between the clamping block 62 and the first base 20 to secure the second rod portion 30 in the second position.

In some embodiments, when the protrusion 32 of the second rod portion 30 slides out of the first rod portion 10, the protrusion 32 is first in contact with and compresses the clamping block 62, causing the first elastic component 64 to be compressed. The first elastic component 64 stores elastic potential energy in a compressed state, and provides power for a subsequent reset action. After the protrusion 32 crosses the clamping block 62, the first elastic component 64 releases a spring force to push the clamping block 62 to accurately reset to the first side of the protrusion 32 facing the second base 40 to form a stable limit. At this time, the first elastic component 64 continuously provides the spring force to maintain a stable limiting relationship between the clamping block 62 and the protrusion 32, thereby effectively preventing the first end of the second rod portion 30 from accidentally sliding into the first rod portion 10 due to an external force. If the limiting relationship between the clamping block 62 and the protrusion 32 is to be released, the users only need to apply a force opposite to an elastic direction of the first elastic component 64, and gently remove the clamping block 62 from the first side of the protrusion 32. At this time, the limiting relationship between the clamping block 62 and the protrusion 32 is broken, and the second rod portion 30 resumes a free sliding state. Such operation process is simple and intuitive, whether the users expand or retract the lamp bracket 1, a state of the lamp bracket 1 is easily switched only by slightly pulling or pressing, which improves use convenience and the user experience and further enables smooth and natural usage and storage of the lamp bracket 1.

In some embodiments, the protrusion 32 includes a first guiding surface 321 on a second side thereof facing away from the second base 40. When the first end of the second rod portion 30 slides outward through the second opening 15, the first guiding surface drives the clamping block 62 to move toward the first elastic component 64 to deform the first elastic component 64. After the protrusion 32 clears the clamping block 62, a restoration force of the first elastic component 64 drives the clamping block 62 to be positioned at the first side of the protrusion 32 facing the second base 40.

In the embodiment, the first guiding surface 321 is an inclined surface or an arc surface, and when the protrusion 32 of the second rod portion 30 gradually slides outward through the second opening 15, the inclined surface or the arc surface on the protrusion 32 is in smoothly contact with the clamping block 62 and then pushes the clamping block 62 to continue to slide along with the second rod portion 30, and the first guiding surface 321 drives the clamping block 62 to gradually move toward a direction of the first elastic component 64, so that the first elastic component 64 is compressed. Such design of the first guiding surface 321 not only enables smoother movement of the clamping block 62, but also provides a clear direction guide for the clamping block 62 to ensure that the clamping block 62 moves toward the first elastic component 64.

In some embodiments, the clamping block 62 includes a second guiding surface 621 on one side thereof facing the second base 40. When the first end of the second rod portion 30 slides outward through the second opening 15, the first end of the second rod portion 30 engages the second guiding surface 621 to drive the clamping block 62 to move toward the first elastic component 64.

In the embodiment, when the protrusion 32 of the second rod portion 30 gradually slides outward through the second opening 15, the protrusion 32 is in contact with the second guiding surface 621 on the clamping block 62. As the second rod portion 30 continues to slide, and the protrusion 32 pushes the clamping block 62 along the second guiding surface 621 to drive the clamping block 62 to move toward the first elastic component 64. The second guiding surface 621 is an inclined surface or an arc surface, such design not only enable the smoother movement of the clamping block 62, but also provides the clear direction guide for the clamping block 62 to ensure that the clamping block 62 strictly moves according to a predetermined direction. In this way, accuracy and reliability of movement of such limiting mechanism. Furthermore, during the above process, the first elastic component 64 is compressed to provide the spring force for subsequent automatic reset.

Whether the first guiding surface 321 is provided on the first side of the protrusion 32 facing away from the second base 40, or the second guiding surface 621 is provided on the one side of the clamping block 62 facing the second base 40, in an expanding process of the lamp bracket 1, the clamping block 62 is automatically triggered to move toward the first elastic component 64 by a sliding action of the second rod portion 30 without manual intervention by the users, and the limiting mechanism is capable of smoothly and accurately completing preparation work to prepare for subsequent limiting operation. When the protrusion 32 of the second rod portion 30 continues to slide, and finally the protrusion 32 of the second rod portion 30 clears the clamping block 62, a restoring force previously stored in the first elastic component 64 due to compression begins to take effect. The restoring force of the elastic component 64 drives the clamping block 62 to move in a direction facing away from the first elastic component 64, until the clamping block 62 is precisely positioned at the first side of the protrusion 32 facing the second base 40. Such process also requires no manual operation, as an automatic reset function of the first elastic component 64 ensures that the clamping block 62 precisely engages with the first side of the protrusion 32, thereby firmly limiting the second rod portion 30 in the second position.

In some embodiments, the at least one limiting portion 60 includes the clamping block 62 and the first elastic component 64, and the clamping block 62 and the first elastic component 64 are disposed in the at least one sliding groove 21. The second rod portion 30 defines at least one positioning hole at the first end thereof, the clamping block 62 is engageable with the at least one positioning hole, and the first elastic component 64 is elastically connected between the clamping block 62 and the first base 20, so as to secure the second rod portion 30 in the second position.

In the embodiment, instead of being provided with the protrusion 32, the first end of the second rod portion 30 defines the at least one positioning hole. When the second rod portion 30 is slid to the second position relative to the first rod portion 10, the spring force of the first elastic component 64 drives the clamping block 62 precisely embed in the at least one positioning hole, thereby firmly limiting the second rod portion 30 in the second position. As a result, even without the protrusion 32 on the second rod portion 30, a stable positional constraint on the lamp bracket 1 is still achieved. To release a positional constraint on the second rod portion 30, a force opposite to the elastic direction of the first elastic component 64 is applied to disengage the clamping block 62 from the at least one positioning hole, which allows the second rod portion 30 to freely slide to retract the lamp bracket 1 for storage.

In some embodiments, the first base 20 defines two sliding grooves 21, the two sliding grooves 21 are respectively disposed at two sides of the second opening 15. Two limiting portions 60 are provided, each of the two limiting portions 60 is disposed in a corresponding one of the two sliding grooves 21.

The embodiment does not limit the number of the at least one sliding groove 21 and at least one limiting portion 60. For example, the first base 20 defines the two sliding grooves 21, and each of the two limiting portions 60 is disposed in the corresponding one of the two sliding grooves 21. When the second rod portion 30 is slid to the second position, the two limiting portions 60 at the two sides of the second opening 15 are engaged with the protrusion 32 on the second rod portion 30 to position at the first side of the protrusion 32 facing the second base 40, so as to constrain the protrusion 32 from both lateral directions for preventing the protrusion 32 from sliding back into the first rod portion 10 during use. In this way, an even distribution of a securing force is ensured, avoiding structural instability or deformation caused by unilateral loading. As a result, the second rod portion 30 is securely constrained in position. Such design not only guarantees a structural balance of the lamp bracket 1, but also provides more stable and reliable positional constraint. Therefore, a supporting framework of the lamp bracket 1 remains stable in the shape of the lantern, without shaking or deforming due to external impacts or environmental factors, thereby improving reliability and safety during use.

In some embodiments, the first base 20 includes a first bottom plate 22, a first side plate 24, and a first sleeve 26, the first side plate 24 and the first sleeve 26 are respectively disposed at two sides of the first bottom plate 22. The first rod portion 10 is disposed in the first sleeve 26, the limiting portion 60 is disposed at one side of the first bottom plate 22 facing away from the first sleeve 26. The first side plate 24 is disposed around a periphery of the first bottom plate 22, and an outer side of the first side plate 24 is connected to each of the elastic bodies 50.

In the embodiment, the first rod portion 10 is disposed in the first sleeve 26, thereby enhancing connection strength between the first rod portion 10 and the first base 20. The first sleeve 26 tightly partially encloses the first rod portion 10, increasing a contact area therebetween and generating sufficient frictional force to further reinforce structural stability of connection between the first rod portion 10 and the first base 20. Such tight fit effectively prevents displacement of the first rod portion 10 and improve overall mechanical strength of the connection between the first rod portion 10 and the first base 20. The first side plate 24 is disposed around the periphery of the first bottom plate 22 to form a protective outer structure, and an outer side of the first side plate 24 is connected to each of the elastic bodies 50 to provide a stable fixing point that ensures the elastic bodies 50 smoothly function during deformation of the lamp bracket 1.

Exemplarily, the first base 20 further includes a first cover plate. The at least one sliding groove 21 is defined on the one side of the first bottom plate 22 facing away from the first sleeve 26, and the first cover component is configured to cover the at least one sliding groove 21. The first cover plate effectively prevents dust or debris from entering the at least one sliding groove 21 while also contributing to a cleaner and more aesthetic structural design.

In some embodiments, the at least one limiting portion 60 includes an elastic piece, the elastic piece is connected to the first base 20, the first end of the second rod portion 30 defines a clamping groove, the elastic piece is inserted into the clamping groove to secure the second rod portion 30 in the second position; or, the at least one limiting portion 60 includes the elastic piece, the elastic piece is connected to the first end of the second rod portion 30, the first base 20 defines the clamping groove, the elastic piece is inserted into the clamping groove to secure the second rod portion 30 in the second position.

Exemplarily, the at least one limiting portion 60 includes the elastic piece, a first end of the elastic piece is connected to the first base 20, and a second end of the elastic piece is a free end. The first end of the second rod portion 30 defines THE clamping groove. When the second rod portion 30 is slid to the second position relative to the first rod portion 10, a resilient force of the elastic piece drives the free end of the elastic piece to automatically clamp into the clamping groove of the second rod portion 30. At this time, the elastic piece tightly fits with the clamping groove to secure the second rod portion 30 in the second position and prevent unintended sliding.

In another embodiment, the at least one limiting portion 60 includes the elastic piece, the elastic piece is connected to the first end of the second rod portion 30. The first base 20 defines the clamping groove corresponding to the elastic piece. When the second rod portion 30 is slid to the second position relative to the first rod portion 10, the resilient force of the elastic piece enables the elastic piece to automatically clamp into the clamping groove of the first base 20. The elastic piece tightly fits with the clamping groove to ensure stable positioning of the second rod portion 30 in the second position, preventing displacement caused by external forces or vibrations.

In either of the above configurations, to release the second rod portion 30 from the second position, the users are capable of depressing the free end of the elastic piece against the spring force of the elastic piece to disengage the elastic piece from the clamping groove. Once disengaged, the second rod portion 30 is free to move, enabling adjustment, retraction, or other functional operations of the lamp bracket 1.

In some embodiments, the at least one limiting portion 60 includes a clamping portion, the second end of the first rod portion 10 defines a first positioning hole, the first end of the second rod portion 30 defines a second positioning hole. When the second rod portion 30 is in the second position relative to the first rod portion 10, the clamping portion is inserted into both the first positioning hole and the second positioning hole to secure the second rod portion 30 in the second position.

In the embodiment, when the second rod portion 30 is in the second position relative to the first rod portion 10, the first positioning hole and the second positioning hole are aligned with each other. The clamping portion is then inserted into the first positioning hole and the second positioning hole that are aligned with each other to secure the second rod portion 30 in the second position, ensuring the stability and the safety of the lamp bracket 1 during use. To release the second rod portion 30 from the second position, the clamping portion is simply withdrawn from the first positioning hole and the second positioning hole, thereby restoring the second rod portion 30 to a movable condition. The clamping portion of the at least one limiting portion 60 is embodied in a variety of suitable forms, including but not limited to a pin, U-shaped component, C-shaped clip, etc.

Essential feature is that the clamping portion of the at least one limiting portion 60 is capable of engaging between the first positioning hole and the second positioning hole that are aligned with each other to achieve positional fixation.

In some embodiments, the lamp bracket 1 further includes at least one positioning portion. When the second rod portion 30 is in the first position relative to the first rod portion 10, at least one of the first rod portion 10 and the second rod portion 30 is connected to the at least one positioning portion to secure the second rod portion 30 in the first position.

In the embodiment, the lamp bracket 1 includes the at least one positioning portion, the at least one positioning portion is configured to secure the second rod portion 30 in the first position, ensuring stability of the lamp bracket 1 during transportation or storage. The at least one positioning portion is an internal structure of the lamp bracket 1 or an external structure of the lamp bracket 1.

Exemplarily, the at least one positioning portion is an external tape. When the second rod portion 30 needs to be secured in the first position, the external tape is tightly wrapped around outer surfaces of the elastic bodies 50 and either the first rod portion 10 or the second rod portion 30. Adhesive and elastic properties of the external tape help prevent unintended sliding of the second rod portion 30 during transportation or storage. Such wrapping method is not only simple to operate, but is also easily removed as needed, facilitating both use and storage of the lamp bracket 1. In another example, the positioning portion includes an internal spring-loaded pin and a corresponding insertion hole. The internal spring-loaded pin is disposed in one of the first rod portion 10 and the second rod portion 30, while another one of the first rod portion 10 and the second rod portion 30 defines the s corresponding insertion hole. When the second rod portion 30 is slid to the first position, a spring force of the internal spring-loaded pin drives the internal spring-loaded pin to automatically engage into the corresponding insertion hole, thereby achieving positional fixation. The internal spring-loaded pin is typically a small cylindrical component disposed the first rod portion 10 or the second rod portion 30 through a spring and is retracted into the first rod portion 10 or the second rod portion 30 when being pressed, once pressure is released, the spring force of the internal spring-loaded pin drives the internal spring-loaded pin to return to an original position. To release the positional fixation, the internal spring-loaded pin is simply pressed inward to disengage from the corresponding insertion hole, allowing the second rod portion 30 to freely slide. The wrapping method is suitable for temporary or emergency fixation, whereas the internal spring-loaded pin and insertion hole arrangement provides a more robust and reliable solution. Both methods effectively prevent unintended movement of the second rod portion 30 when the second rod portion 30 is in the first position, thereby ensuring the stability of the lamp bracket 1 during transportation or storage.

Figure 9:
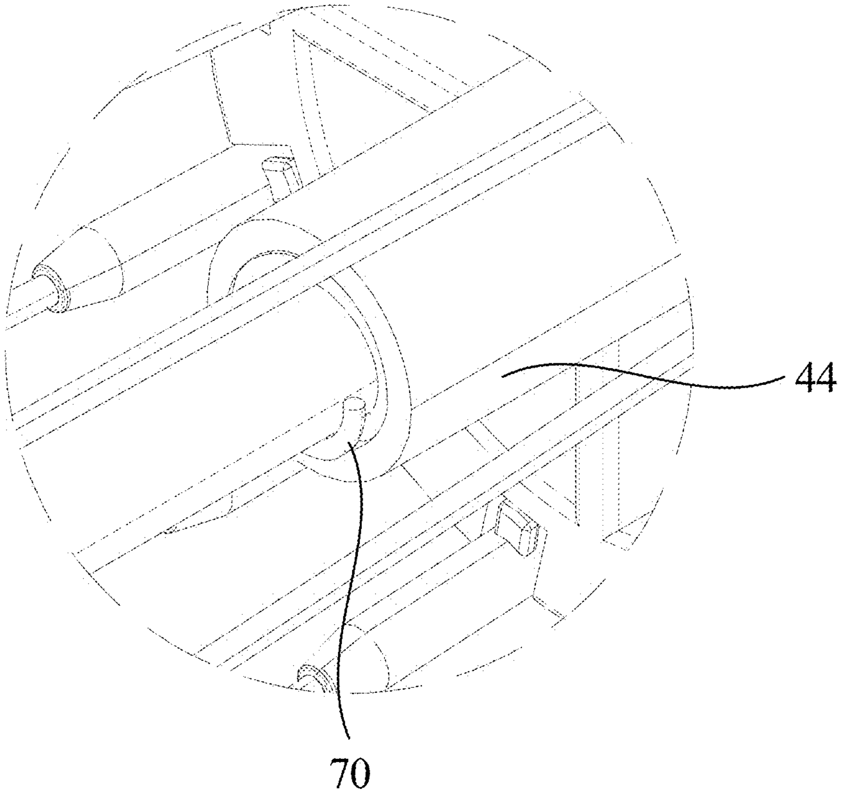
FIG. 9 is an enlarged schematic diagram of portion F shown in FIG. 1.
Figure 10:
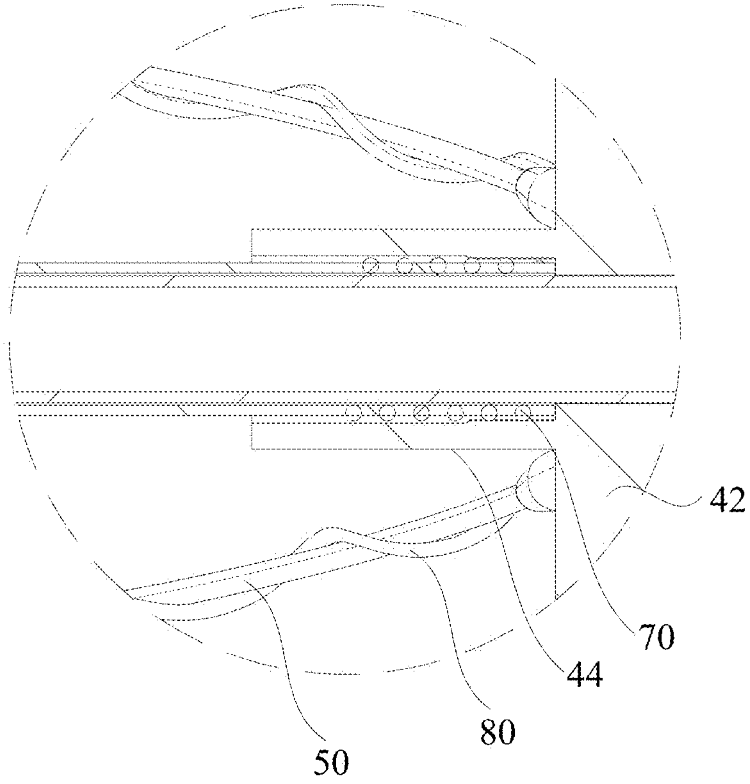
FIG. 10 is an enlarged schematic diagram of portion D shown in FIG. 5.

Please further refer to FIGS. 9-10, FIG. 9 is an enlarged schematic diagram of portion F shown in FIG. 1, and FIG. 10 is an enlarged schematic diagram of portion D shown in FIG. 5.

In some embodiments, the second base 40 includes a second bottom plate 42 and a second sleeve 44, the second sleeve 44 is connected to one side of the second bottom plate 42, the second rod portion 30 is disposed in the second sleeve 44, and an outer side of the second bottom plate 42 is connected to each of the elastic bodies 50.

In the embodiment, the second rod portion 30 is partially disposed in the second sleeve 44, thereby enhancing connection strength between the second rod portion 30 and the second base 40, allowing the second rod portion 30 to be firmly disposed thereon. The elastic bodies 50 are connected to the outer side of the second bottom plate 42, providing a stable fixing point for the elastic bodies 50. In this way, smoothly switching the lamp bracket between the stored state and the use state is enabled.

In some embodiments, the lamp bracket 1 includes a second elastic component 70, the second elastic component 70 is sleeved on the second rod portion 30 and is at least partially disposed in the second sleeve 44. When the second rod portion 30 is in the second position relative to the first rod portion 10, the first rod portion 10 abuts against the second elastic component 70.

In the embodiment, when the second rod portion 30 is in the second position relative to the first rod portion 10, the first rod portion 10 abuts against the second elastic component 70. The second elastic component 70 is compressed and deformed, generating an elastic force that prevents direct impact between the second rod portion 30 and the second sleeve 44, thereby providing a cushioning effect and protecting structural integrity of the lamp bracket 1. Additionally, the elastic force helps to retain the second rod portion 30 in the second position, preventing excessive sliding and ensuring the stability of the lamp bracket 1 during use.

In some embodiments, when the second rod portion 30 is in the first position relative to the first rod portion 10, the second elastic component 70 is partially exposed from the second sleeve 44.

In the embodiment, as the second rod portion 30 slides from the first position to the second position, the second end of the second rod portion 30 gradually approaches an exposed portion of the second elastic component 70 protruding from the second sleeve 44. As sliding continues, the second rod portion 30 comes into contact with and begins to compress the second elastic component 70. With continued movement of the second rod portion 30, a compression force on the second elastic component 70 progressively increases, causing the second elastic component 70 to undergo elastic deformation, being compressed or bent. Upon reaching the second position, the second rod portion 30 causes the second elastic component 70 to be fully compressed between itself and the second sleeve 44, thereby attaining its maximum deformation state and accumulating elastic potential energy. Elastic deformation of the second elastic component 70 serves to absorb impact forces produced during sliding of the second rod portion 30, thereby avoiding direct collision between the second rod portion 30 and the second sleeve 44. Such arrangement not only safeguards the structural integrity of the lamp bracket 1 and minimizes mechanical wear, but also ensures stable positioning of the second rod portion 30 at the second location.

In some embodiments, first ends of the elastic bodies 50 are connected to each other, and second ends of the elastic bodies 50 are connected to each other. In some examples, the lamp bracket 1 further includes at least two connecting rings, a first one of the at least two connecting rings is sleeved on the first base 20, a second one of the at least two connecting rings is sleeved on the second base 40, the first ends of the elastic bodies 50 are connected to the first one of the at least two connecting rings sleeved on the first base 20, and the second ends of the elastic bodies 50 are connected to the second one of the at least two connecting rings sleeved on the second base portion 40. Specifically, the first ends of the elastic bodies 50 are spaced apart from each other and is uniformly disposed around the first base 20, and the second ends of the elastic bodies 50 are spaced apart from each other and is uniformly disposed around the second base 40.

In some embodiments, a first annular groove is defined on a periphery of the first base 20, and the first annular groove is configured to accommodate a corresponding one of the at least two connecting rings to facilitate accommodating the corresponding one of the at least two connecting rings, so that the corresponding one of the at least two connecting rings is stably mounted on the first base 20.

In some embodiments, the first base 20 further defines first communicating grooves, each of the first communicating grooves is disposed on one side of the first annular groove facing the second base 40, each of the first communicating grooves is communicated with the first annular groove, and each of the first communicating grooves extends through at both ends along a direction from the first base 20 to the second base 40. When the second rod portion 30 is in the first position relative to the first rod portion 10, the elastic bodies 50 axially extend along the first rod portion 10 and are respectively disposed in the first communicating grooves. When the second rod portion 30 is in the second position relative to the first rod portion 10, the elastic bodies 50 are bent and disengage from the first communicating grooves.

In some embodiments, a second annular groove is defined on a periphery of the second base 40, and the second annular groove is configured to accommodate a corresponding one of the at least two connecting rings to facilitate accommodating the corresponding one of the at least two connecting rings, so that the corresponding one of the at least two connecting rings is stably mounted on the second base 40.

In some embodiments, the second base 40 further defines second communicating grooves, each of the second communicating grooves is disposed on one side of the second annular groove facing the first base 20, each of the second communicating grooves is communicated with the second annular groove, and each of the second communicating grooves extends through at both ends along a direction from the second base 40 to the first base 20. When the second rod portion 30 is in the first position relative to the first rod portion 10, the elastic bodies 50 axially extend along the first rod portion 10 and are respectively disposed in the second communicating grooves. When the second rod portion 30 is in the second position relative to the first rod portion 10, the elastic bodies 50 are bent and disengage from the second communicating grooves.

The embodiments of the present disclosure further provides a lamp, includes the lamp bracket 1 and a lamp strip 80, and a structure of the lamp bracket 1 may be a structure of the lamp bracket 1 in any one of the foregoing embodiments and is not repeated herein. The at least one light strip 80 is disposed on the lamp bracket 1.

In some embodiments, each light strip 80 is disposed on the elastic bodies 50.

In the embodiment, the elastic bodies 50 not only serve as ta support structure for the lamp bracket 1 but also function as carriers for the light strip 80. When the lamp bracket 1 assumes a lantern configuration, the elastic bodies 50 bend into the arc shape to form a lantern skeleton, while the light strip 80 is wound or fixed onto the elastic bodies 50, thereby completing a lantern structure. In this way, when the lamp bracket 1 is expanded, the lamp bracket 1 not only provides structural support but also creates a visual effect of a traditional lantern through illumination of the light strip 80, thereby seamlessly marrying functional utility with decorative aesthetics.

In some embodiments, at least one of the elastic bodies 50 includes at least one positioning lug 52, the at least one positioning lug 52 is connected to the light strip 80 to limit movement of the light strip 80.

In the embodiment, the at least one of the elastic bodies 50 includes the at least one positioning lug 52, and the at least one positioning lug 52 is connected to the light strip 80 to limit the movement of the light strip 80. When the lamp bracket 1 assumes the lantern configuration with the elastic bodies 50 bent into the arc shape to form the lantern skeleton, the light strip 80 is wound or fixed onto the elastic bodies 50. The at least one positioning lug 52 is a protruding portion or an annular structure formed on the at least one of the elastic bodies 50, the light strip 80 is fastened by straps or directly fixed on the at least one positioning lug 52, so as to prevent the light strip 80 from slipping or moving on the at least one of the elastic bodies 50. In this way, stable installation of the light strip 80 on the lamp bracket 1 is ensured, lantern structural integrity of the lamp bracket 1 is maintained, and both decorative appeal and functionality of the lamp bracket 1 are enhanced.

In some embodiments, each of two ends of each of the elastic bodies 50 includes the at least one positioning lug 52.

In the embodiment, when the light strip 80 is wound around the elastic bodies 50, both ends of the light strip 80 are secured to the at least one positioning lug 52 at each of the two ends of each of the elastic bodies 50. The at least one positioning lug 52 firmly engage both ends of the light strip 80 to effectively prevent the light strip 80 from moving along the elastic bodies 50. Such configuration not only ensures stable fixation of the light strip 80 on the elastic bodies 50 but also enables the light strip 80 to uniformly wind around the elastic bodies 50, thereby forming a lantern profile with aesthetic appeal. As the elastic bodies 50 bend into the arc shape, the at least one positioning lug 522 maintain end-to-end positioning of the light strip 80, so as to the light strip 80 preventing slipping or loosening caused by gravitational or environmental forces (e.g., wind), thereby enhancing both decorative appeal and functionality of the lamp bracket 1.

In the foregoing embodiments, description of each embodiment has its own emphasis, and parts that are not described in detail in an embodiment may refer to related descriptions of other embodiments. The embodiments, implementations, and related technical features of the present disclosure may be combined and replaced with each other without conflict.

The lamp bracket and the lamp in the embodiments of the present disclosure is described in detail above, and specific examples are used herein to describe principles and the embodiments of the present disclosure, and description of the above embodiments is only used to help understand a method of the present disclosure and a core idea thereof; meanwhile, for those who skilled in the art, according to the idea of the present disclosure, there may be changes in specific embodiments and application ranges. In summary, a content of the present specification should not be construed as limiting the present disclosure.

What is claimed is:

1. A lamp bracket, comprising:

a first rod portion having a hollow region therein;

at least one limiting portion;

a second rod portion; and elastic bodies;

wherein the first rod portion defines a first opening at a first end thereof, and the first opening is communicated with the hollow region;

wherein the second rod portion extends through the first opening and is slidable relative to the first rod portion, a first end of the second rod portion extends into the hollow region and slides toward a second end of the first rod portion;

wherein a first end of each of the elastic bodies is connected to the second end of the first rod portion, and a second end of each of the elastic bodies is connected to a second end of the second rod portion;

wherein when the second rod portion is in a first position relative to the first rod portion, the elastic bodies axially extend along the first rod portion;

wherein when the second rod portion is in a second position relative to the first rod portion, the elastic bodies are in a bent configuration;

wherein the first rod portion defines a second opening at the second end thereof; and when the first end of the second rod portion slides outward through the second opening, the at least one limiting portion is connected to the second end of the second rod portion to secure the second rod portion in the second position.

2. The lamp bracket according to claim 1, wherein the lamp bracket further comprises a first base and a second base, the first base is connected to the second end of the first rod portion, the second base is connected to the second end of the second rod portion;

the first end of each of the elastic bodies is connected to the first base and is connected to the second end of the first rod portion through the first base, and the second end of each of the elastic bodies is connected to the second base and is connected to the second end of the second rod portion through the second base.

3. The lamp bracket according to claim 2, wherein the first base defines at least one sliding groove, the at least one limiting portion is disposed in the at least one sliding groove, a protrusion is disposed at the first end of the second limiting portion; and when the at least one limiting portion is positioned at a first side of the protrusion facing the second base, the second rod portion is secured in the second position.

4. The lamp bracket according to claim 3, wherein the at least one limiting portion comprises a clamping block and a first elastic component, the clamping block and the first elastic component are disposed in the at least one sliding groove; and when the at least one limiting portion is disposed at the first side of the protrusion facing the second base, the first elastic component is elastically connected between the clamping block and the first base to secure the second rod portion in the second position.

5. The lamp bracket according to claim 4, wherein the protrusion comprises a first guiding surface on a second side thereof facing away from the second base;

when the first end of the second rod portion slides outward through the second opening, the first guiding surface drives the clamping block to move toward the first elastic component to deform the first elastic component; and after the protrusion clears the clamping block, a restoration force of the first elastic component drives the clamping block to be positioned at the first side of the protrusion facing the second base.

6. The lamp bracket according to claim 4, wherein the clamping block comprises a second guiding surface on one side thereof facing the second base;

when the first end of the second rod portion slides outward through the second opening, the first end of the second rod portion engages the second guiding surface to drive the clamping block to move toward the first elastic component.

7. The lamp bracket according to claim 3, wherein the first base defines two sliding grooves, the two sliding grooves are respectively disposed at two sides of the second opening; and two limiting portions are provided, each of the two limiting portions is disposed in a corresponding one of the two sliding grooves.

8. The lamp bracket according to claim 2, wherein the first base defines at least one sliding groove, the at least one limiting portion comprises a clamping block and a first elastic component, and the clamping block and the first elastic component are disposed in the at least one sliding groove; and the second rod portion defines at least one positioning hole at the first end thereof, the clamping block is engageable with the at least one positioning hole, the first elastic component is elastically connected between the clamping block and the first base, so as to secure the second rod portion in the second position.

9. The lamp bracket according to claim 2, wherein the first base comprises a first bottom plate, a first side plate, and a first sleeve, the first side plate and the first sleeve are respectively disposed at two sides of the first bottom plate;

the first rod portion is disposed in the first sleeve, the limiting portion is disposed at one side of the first bottom plate facing away from the first sleeve; and the first side plate is disposed around a periphery of the first bottom plate, and an outer side of the first side plate is connected to each of the elastic bodies.

10. The lamp bracket according to claim 9, wherein the second base comprises a second bottom plate and a second sleeve, the second sleeve is connected to one side of the second bottom plate, the second rod portion is disposed in the second sleeve, and an outer side of the second bottom plate is connected to each of the elastic bodies.

11. The lamp bracket according to claim 10, wherein the lamp bracket comprises a second elastic component, the second elastic component is sleeved on the second rod portion and is at least partially disposed in the second sleeve; and when the second rod portion is in the second position relative to the first rod portion, the first rod portion abuts against the second elastic component.

12. The lamp bracket according to claim 11, wherein when the second rod portion is in the first position relative to the first rod portion, the second elastic component is partially exposed from the second sleeve.

13. The lamp bracket according to claim 2, wherein the at least one limiting portion comprises an elastic piece, the elastic piece is connected to the first base, the first end of the second rod portion defines a clamping groove, the elastic piece is inserted into the clamping groove to secure the second rod portion in the second position; or the at least one limiting portion comprises the elastic piece, the elastic piece is connected to the first end of the second rod portion, the first base defines the clamping groove, the elastic piece is inserted into the clamping groove to secure the second rod portion in the second position.

14. The lamp bracket according to claim 2, wherein the at least one limiting portion comprises a clamping portion, the second end of the first rod portion defines a first positioning hole, the first end of the second rod portion defines a second positioning hole;

when the second rod portion is in the second position relative to the first rod portion, the clamping portion is inserted into both the first positioning hole and the second positioning hole to secure the second rod portion in the second position.

15. The lamp bracket according to claim 1, wherein the lamp bracket further comprises at least one positioning portion; and when the second rod portion is in the first position relative to the first rod portion, at least one of the first rod portion and the second rod portion is connected to the at least one positioning portion to secure the second rod portion in the first position.

16. A lamp, comprising:

a lamp bracket; and at least one light strip disposed on the lamp bracket, wherein the lamp bracket comprises a first rod portion having a hollow region therein, a second rod portion, and elastic bodies;

wherein the first rod portion defines a first opening at a first end thereof, and the first opening is communicated with the hollow region;

wherein the second rod portion extends through the first opening and is slidable relative to the first rod portion, a first end of the second rod portion extends into the hollow region and slides toward a second end of the first rod portion;

wherein a first end of each of the elastic bodies is connected to the second end of the first rod portion, and a second end of each of the elastic bodies is connected to a second end of the second rod portion;

wherein when the second rod portion is in a first position relative to the first rod portion, the elastic bodies axially extend along the first rod portion;

wherein when the second rod portion is in a second position relative to the first rod portion, the elastic bodies are in a bent configuration;

wherein at least one of the elastic bodies comprises at least one positioning lug, the at least one positioning lug is connected to the at least one light strip to limit movement of the at least one light strip.

17. The lamp according to claim 16, wherein each of two ends of each of the elastic bodies comprises the at least one positioning lug.

18. A lamp bracket, comprising:

a first rod portion having a hollow region therein;

a second rod portion;

at least one limiting portion;

a first base;

a second base; and elastic bodies;

wherein the first rod portion defines a first opening at a first end thereof, and the first opening is communicated with the hollow region;

wherein the second rod portion extends through the first opening and is slidable relative to the first rod portion, a first end of the second rod portion extends into the hollow region and slides toward a second end of the first rod portion;

wherein a first end of each of the elastic bodies is connected to the second end of the first rod portion, and a second end of each of the elastic bodies is connected to a second end of the second rod portion;

wherein when the second rod portion is in a first position relative to the first rod portion, the elastic bodies axially extend along the first rod portion;

wherein when the second rod portion is in a second position relative to the first rod portion, the elastic bodies are in a bent configuration;

wherein the at least one limiting portion comprises an elastic piece, the elastic piece is connected to the first base, the first end of the second rod portion defines a clamping groove, the elastic piece is inserted into the clamping groove to secure the second rod portion in the second position; or the at least one limiting portion comprises the elastic piece, the elastic piece is connected to the first end of the second rod portion, the first base defines the clamping groove, the elastic piece is inserted into the clamping groove to secure the second rod portion in the second position.

* * * * *